United States Patent [19]
Vaughan

[11] 3,884,835
[45] May 20, 1975

[54] CRYSTALLINE SILICA COMPOSITIONS
[75] Inventor: David E. W. Vaughan, Ellicott City, Md.
[73] Assignee: W. R. Grace & Co., New York, N.Y.
[22] Filed: Feb. 9, 1973
[21] Appl. No.: 331,290

[52] U.S. Cl............. 252/451; 252/432; 252/455 R; 252/456; 252/458; 423/338; 423/339
[51] Int. Cl. .... B01j 11/36; B01j 11/40; B01j 11/06
[58] Field of Search........ 252/451, 455 R, 456, 458, 252/432; 423/335, 338, 339

[56] References Cited
UNITED STATES PATENTS
| | | | |
|---|---|---|---|
| 2,876,072 | 3/1959 | Coes, Jr. | 423/335 |
| 3,647,709 | 3/1972 | Hill | 252/451 X |
| 3,696,053 | 10/1972 | Le Page et al. | 252/451 X |

*Primary Examiner*—Carl F. Dees
*Attorney, Agent, or Firm*—Michael J. McGreal

[57] ABSTRACT

New crystalline silicas are synthesized from a sodium silicate or other silica source solution having a $Na_2O/SiO_2$ ratio of about 0.3 up to 7. These new silicas are formed at elevated temperatures wherein the precursor solution is at a pH of at least about 10. The precursor solution is aged for from 15–75 days, preferably with a promotor which is a metal salt of group 3A, 5B or 6B. Depending on the reaction period the silica is either of a very fine particle ($<.2\mu$) or of a platelet form.

17 Claims, No Drawings

CRYSTALLINE SILICA COMPOSITIONS

This invention relates to new crystalline silica compositions. Further, this invention relates to methods for producing these new crystalline silica materials.

Silicas can be present in amorphous or crystalline states. The amorphous silicas are those generally termed silica gels, precipitated silicas and fumed or pyrogenic silicas. These amorphous silicas are used as fillers, thickening agents, flatting agents, anti-plateout agents and adsorbents. Silica gel is the principal adsorbent from this class, and its main use is as a desiccant. In distinction to these amorphous silicas, the silicas of this invention are crystalline. These crystalline silicas have nitrogen surface areas (B.E.T.) of about 75–150 m$^2$/g, water adsorptions at 50 percent relative humidity of 11–14 percent by weight, and high carbon dioxide adsorption capacities. These crystalline silicas are useful as adsorbents, fillers and as pigments.

The presently known stable crystalline phases of silica are quartz, tridymite and cristobalite, and polymorphic forms of each of these stable forms. These crystalline phases of silica are fairly dense and have a low surface area. That is, these crystalline phases have a low porosity. For this reason, these known stable crystalline phases of silica have very low adsorptive properties and in essence are not classified as having any adsorptive properties. The crystalline silicas of the present invention, although crystalline, have high surface areas and comparatively are good adsorbents.

It is a prime object of this invention to set out new crystalline silicas which exhibit high surface areas and good adsorptive properties.

It is further an object of this invention to produce crystalline silicas which have a platelet form and which may be used as narceous pigments.

It is also an object of this invention to set out methods for making crystalline silicas from a promoted or unpromoted silicate solution or from a colloidal amorphous silica.

In more detail the crystalline silica hereafter designated V-3 has the following x-ray powder diffraction pattern:

Table 1

SILICA V-3

| $2\theta$ | dA | Intensity* |
|---|---|---|
| 4.72 | 18.70 | MS |
| 5.75 | 15.56 | M |
| 12.1 | 7.31 | W |
| 24.6 | 3.62 | M |
| 25.9 | 3.44 | VS |
| 26.4 | 3.37 | S |
| 28.6 | 3.12 | MS |
| 33.7 | 2.66 | W |
| 35.5 | 2.53 | W |
| 40.9 | 2.20 | W |

*MS = medium strong,
M = medium,
S = strong,
VS = very strong;
W = weak

The chemical composition is essentially 100 percent silica with less than about 3 percent Al$_2$O$_3$ and Na$_2$O, depending on the synthesis technique.

The crystalline silica hereafter designated V-13 has the following x-ray diffraction pattern:

Table 2

SILICA V-13

| $2\theta$ | dA | Intensity |
|---|---|---|
| 5.68 | 15.55 | VS |
| 11.40 | 7.56 | M |
| 17.11 | 5.18 | M |
| 24.48 | 3.63 | M |
| 25.05 | 3.55 | M |
| 25.86 | 3.44 | VS |
| 26.54 | 3.36 | VS |
| 27.00 | 3.30 | S |
| 28.36 | 3.14 | S |
| 31.80 | 2.81 | W |
| 34.00 | 2.64 | W |
| 34.64 | 2.59 | W |

This silica is a crystalline silica with less than about 5 percent impurities (mainly Al$_2$O$_3$ and Na$_2$O when these are present in the synthesis mixture). This silica V-13 has a thin platelet structure having plate length to thickness ratios of about 5:1 to 100:1.

Each of these crystalline silicas has a water capacity at 50 percent relative humidity of about 11 to 14 weight percent. The carbon dioxide and nitrogen adsorptive capacities at 600 torr and 35°C are in the range of 2 to 6 percent. This is considerably higher than the known polymorphs of silica which are usually fairly dense and nonporous materials.

These crystalline silicas can be prepared over a wide range of initial silica concentrations, at a temperature in the range of about 100°C to 250°C, and at 1 atmosphere to 15 atmospheres pressure. The synthesis may be promoted or unpromoted. When promoted, a metal oxide or metal oxide yielding salt of a metal preferably selected from the Group 3A, Group 5B or Group 6B elements is chosen. The silica source may be a sodium silicate, sodium meta silicate, a silica hydrosol or a colloidal silica.

Whether a silica V-3 or a silica V-13 is produced depends on the crystallization and aging time. Aging times of about 10 up to 30 days will yield predominately a silica V-3 material, while aging times of more than about 30 days will usually yield predominantly a silica V-13 material. In essence what happens is that as the aging time exceeds 30 days the silica V-3 which is present is converted to a silica V-13. Around the period of about 20 to 45 days, and depending on the reaction temperature, pressure and amount of promoter, there will be mixtures of silica V-3 and silica V-13 present. Therefore, in the synthesis of these materials, quantities of silica V-3 may be changed to the platelet silica V-13 form by an increased reaction time.

Other than the time duration of reaction, the modes of synthesis of silica V-3 and silica V-13 are essentially the same. Similar concentration temperatures, pressures and promoters may be used, as well as similar equipment.

In the usual mode of synthesis, a silicate solution or silica slurry is formed wherein the Na$_2$O/SiO$_2$ ratio is in the range of 0.3 up to 7. Na$_2$O may be replaced in whole or in part by K$_2$O. The ratio of water to silica is about 20 to 125. Sodium hydroxide, amorphous silica, sodium silicate or potassium silicate can be added to adjust the concentration to within this range. The pH should be about 10 or greater. This mixture is then heated to the range of 100°C to 250°C for from about 10 to 75 days, the exact time depending on the crystalline silica form to be produced. At temperatures above about 110°C, a pressure reaction vessel such as an autoclave must be used. After this period of time, the mixture is cooled and a unique crystalline silica recovered.

Although any of the elements of Groups 3A, 5B or 6B are preferred as promoters of this synthesis, the best promoters were found to be oxide yielding salts of tungsten, vanadium, molybdenum and boron. The ratio of promoter (MO) as soluble oxides to silica in the reaction slurry or mixture is in the range of 0 to 1. The sources of these promoters include the salts, such as soluble tungstates, vanadates, molybdates, borates, etc., their oxides or acids, for example $NH_4VO_3$, $NaVO_3$, $H_3BO_3$, $Na_2B_4O_7$, $MoO_3$, $WO_3$ and the like.

Typical adsorption properties of a silica V-3 are:

| | | | |
|---|---|---|---|
| $N_2$ Surface Area at | −198°C = | 100 | $m^2/g$ |
| $H_2O$ Adsorption (50% R.H.) | = | 12.2 | wt. % |
| $CO_2$ Adsorption: | | | |
| (600 torr) | | | |
| | −78°C = | 8.7 | wt. % |
| | −42°C = | 6 | wt. % |
| | 0°C = | 4 | wt. % |

This silica also exhibits a high thermal and chemical stability.

Typical adsorption properties of a silica V-13 are:

| | | | |
|---|---|---|---|
| $N_2$ Surface Area at | −198°C = | 50 | $m^2/gm$ |
| $H_2O$ | = | 13.4 | wt. % |
| $CO_2$ Adsorption | | | |
| (600 torr) | | | |
| | −78°C = | 3.2 | wt. % |
| | −25°C = | 2.6 | wt. % |

This crystalline silica, due principally to its platelet type of structure, is also a good filler material for resins, and particularly where a pearl-like appearance is desired.

The following examples are set out to further amplify the present invention.

EXAMPLE 1

Four aqueous solutions of sodium silicate (30 percent $SiO_2$, 8.5 percent $Na_2O$) were placed in autoclaves so that a first autoclave was one-quarter full, a second autoclave was one-half full, a third autoclave was three-quarters full and a fourth autoclave was full. Each autoclave was heated at 130°C for up to 40 days. After this period of time, the mixture was cooled, the solids vacuum filter washed with deionized water and dried. Each dried silica gave the silica V-3 x-ray diffraction pattern, and the chemical analysis indicated greater than 99 percent silica.

EXAMPLES 2–5

A series of colloidal silica reaction solutions (Ludox HS) were formulated, having the composition 0.6 $Na_2O$: $SiO_2$: X MO: 24 $H_2O$ wherein MO is a metal oxide and $x$ the mole amount of this metal oxide as set out in Table 2.

Table 2

| Example | Ion | Salt | Mole Amount as Oxide |
|---|---|---|---|
| 2 | W | $WO_3$ | 0.25 |
| 3 | V | $NaVO_3$ | 0.1 |
| 4 | Mo | $MoO_3$ | 0.3 |
| 5 | B | $H_3BO_3$ | 0.2 |

Each of these solutions was placed in an autoclave filled one-quarter to three-quarters full and heated at 125°C for 30 days. The autoclaves were then cooled and the silica vacuum filter washed using deionized water. After drying each gave the x-ray diffraction pattern of silica V-3.

EXAMPLE 6

A sodium silicate solution containing potassium hydroxide and molybdenum oxide was formed. This solution has the following composition: $(K,Na)_2O$: 0.5 $Mo_2O_3$: 2 $SiO_2$: 50 $H_2O$. This solution was heated at 150°C in an autoclave for 30 days. The autoclave was then cooled and the resulting silica removed and vacuum filter washed using deionized water. The silica product analyzes as 97 percent $SiO_2$ and has an x-ray powder diffraction pattern of Silica V-3.

EXAMPLE 7

A solution containing 68 g of colloidal silica (Ludox HS) was mixed with a solution of 6 g of sodium hydroxide dissolved in 120 g of water. This solution was divided into two portions. Portion 1 (pH 12.5) was reacted without further changes for 45 days at 132°C in an autoclave. Portion 2 was adjusted to a pH of 11, using hydrochloric acid and then reacted for 45 days at 132°C in an autoclave. The resulting materials were water washed and dried. Each silica gave the x-ray diffraction pattern of silica V-13, and contained more than 98 percent silica.

EXAMPLE 8

A solution containing 34 g of a colloidal silica (Ludox HS) was mixed with a solution containing 6 g of sodium hydroxide and 13 g of vanadium pentoxide dissolved in 135 g of water. This solution mixture was adjusted to a pH of 11 using hydrochloric acid, and reacted for 45 days at 132°C in an autoclave. The resulting solid product was water washed and dried. This silica product gave the x-ray diffraction pattern of silica V-13, and contained 98 percent $SiO_2$.

EXAMPLE 9

A solution containing 136 g of colloidal silica (Ludox HS) was mixed with a solution of 24 g of sodium hydroxide and 17.2 g of molybdenum trioxide dissolved in 240 g of water. This solution mixture was reacted for 40 days in an autoclave and dried. This silica product gives the x-ray diffraction pattern of silica V-13.

EXAMPLE 10

The procedure of Example 9 was repeated, except that the molybdenum trioxide was replaced by 28 g of tungsten trioxide. The resulting silica product also gave the x-ray diffraction pattern of silica V-13.

What is claimed is:

1. The crystalline silica composition having the x-ray diffraction pattern

| $2\theta$ | dA | Intensity |
|---|---|---|
| 4.72 | 18.70 | MS |
| 5.75 | 15.56 | M |
| 12.1 | 7.31 | W |
| 24.6 | 3.62 | M |
| 25.9 | 3.44 | VS |
| 26.4 | 3.37 | S |

-Continued

| 2θ | dA | Intensity |
|---|---|---|
| 28.6 | 3.12 | MS |
| 33.7 | 2.66 | W |
| 35.5 | 2.53 | W |
| 40.9 | 2.20 | W. |

2. The method of producing a crystalline silica comprising forming an aqueous alkali silica mixture wherein the ratio of alkali oxide to silica is in the range of 0.3 up to 7, heating said mixture at about 100°C to 250°C for from about 10 up to 40 days, and recovering a crystalline silica.

3. The method as in claim 2 wherein the source of silica in said mixture is sodium silicate and said alkali is selected from the group consisting of sodium, potassium and mixtures thereof.

4. The method as in claim 2 wherein the source of silica in said mixture is colloidal silica and said alkali is selected from the group consisting of sodium, potassium and mixtures thereof.

5. The method as in claim 2 wherein said mixture contains a promotional metal oxide selected from the group consisting of Group 3A metal oxides, Group 5B metal oxides, Group 6B metal oxides and mixtures thereof.

6. The method as in claim 5 wherein said metal oxide is selected from the group consisting of tungsten oxides, vanadium oxides, molybdenum oxides and boron oxides.

7. The method as in claim 5 wherein the ratio of promotional metal oxide to silica is up to about 1.

8. The method as in claim 2 wherein said crystalline silica has a nitrogen surface area of greater than 40 m²/g and an x-ray diffraction pattern of

| 2θ | dA | Intensity |
|---|---|---|
| 4.72 | 18.70 | MS |
| 5.75 | 15.56 | M |
| 12.1 | 7.31 | W |
| 24.6 | 3.62 | M |
| 25.9 | 3.44 | VS |
| 26.4 | 3.37 | S |
| 28.6 | 3.12 | MS |
| 33.7 | 2.66 | W |
| 35.5 | 2.53 | W |
| 40.9 | 2.20 | W. |

9. The crystalline silica composition having the x-ray diffraction pattern of

| 2θ | dA | Intensity |
|---|---|---|
| 5.68 | 15.55 | VS |
| 11.40 | 7.56 | M |

-Continued

| 2θ | dA | Intensity |
|---|---|---|
| 17.11 | 5.18 | M |
| 24.48 | 3.63 | M |
| 25.05 | 3.55 | M |
| 25.86 | 3.44 | VS |
| 26.54 | 3.36 | VS |
| 27.00 | 3.30 | S |
| 28.36 | 3.14 | S |
| 31.80 | 2.81 | W |
| 34.00 | 2.64 | W |
| 34.64 | 2.59 | W. |

10. The method of producing a crystalline silica comprising forming an aqueous alkali silica mixture wherein the ratio of alkali oxide to silica is in the range of 0.3 up to 7, heating said mixture at about 100°C to 250°C for from more than about 40 days, and recovering a crystalline silica.

11. The method as in claim 10 wherein the source of silica in said mixture is sodium silicate and said alkali is selected from the group consisting of sodium, potassium and mixtures thereof.

12. The method as in claim 10 wherein the source of silica in said mixture is colloidal silica and said alkali is selected from the group consisting of sodium, potassium and mixtures thereof.

13. The method as in claim 10 wherein said mixture contains a promotional metal oxide selected from the group consisting of Group 3A metal oxides, Group 5B metal oxides, Group 6B metal oxides and mixtures thereof.

14. The method as in claim 13 wherein said metal oxide is selected from the group consisting of tungsten oxides, vanadium oxides, molybdenum oxides and boron oxides.

15. The method as in claim 13 wherein the ratio of promotional metal oxide to silica is up to about 1.

16. The method as in claim 10 wherein said crystalline silica has a nitrogen surface area of greater than 40 m²/g and an x-ray diffraction pattern of

| 2θ | dA | Intensity |
|---|---|---|
| 5.68 | 15.55 | VS |
| 11.40 | 7.56 | M |
| 17.11 | 5.18 | M |
| 24.48 | 3.63 | M |
| 25.05 | 3.55 | M |
| 25.86 | 3.44 | VS |
| 26.54 | 3.36 | VS |
| 27.00 | 3.30 | S |
| 28.36 | 3.14 | S |
| 31.80 | 2.81 | W |
| 34.00 | 2.64 | W |
| 34.64 | 2.59 | W. |

17. The method as in claim 16 wherein said crystalline silica is platelet in form having length to thickness ratios of about 5:1 to 100:1.

\* \* \* \* \*